United States Patent
Li

(10) Patent No.: US 9,973,227 B2
(45) Date of Patent: May 15, 2018

(54) PORTABLE COMMUNICATION DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Qiying Li, Mie (JP)

(73) Assignees: AutoNetworks Technologies, Ltd., Yokkaichi, Mie (JP); Sumitomo Wiring Systems, Ltd., Yokkaichi-shi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days. days.

(21) Appl. No.: 15/557,175

(22) PCT Filed: Mar. 18, 2016

(86) PCT No.: PCT/JP2016/058646
§ 371 (c)(1),
(2) Date: Nov. 13, 2017

(87) PCT Pub. No.: WO2016/148270
PCT Pub. Date: Sep. 22, 2016

(65) Prior Publication Data
US 2018/0076838 A1  Mar. 15, 2018

(30) Foreign Application Priority Data
Mar. 19, 2015  (JP) ................................. 2015-056477

(51) Int. Cl.
*H04B 1/38* (2015.01)
*H04B 1/3822* (2015.01)
(Continued)

(52) U.S. Cl.
CPC .......... *H04B 1/3822* (2013.01); *B60R 25/01* (2013.01); *B60R 25/241* (2013.01);
(Continued)

(58) Field of Classification Search
CPC ..... H04B 1/3822; B60R 25/01; B60R 25/241; B60R 25/243
(Continued)

(56) References Cited

U.S. PATENT DOCUMENTS

2017/0327085 A1* 11/2017 Nishiyama ............ B60R 25/241
2018/0029560 A1*  2/2018 Mohaupt ............... B60R 25/209

FOREIGN PATENT DOCUMENTS

| JP | 2008-045272 A | 2/2008 |
| JP | 2009-177642 A | 8/2009 |
| JP | 2009-177644 A | 8/2009 |

OTHER PUBLICATIONS

Search Report for PCT/JP2016/058646, dated May 24, 2016.

* cited by examiner

*Primary Examiner* — Allen T Cao
(74) *Attorney, Agent, or Firm* — Dinsmore & Shohl LLP

(57) ABSTRACT

A portable communication device that can suppress degradation in communication efficiency caused by a reduction in device size. The portable communication device includes a mechanical key that is made of an electrical conductor and is for mechanically locking or unlocking a door of a vehicle, and a transmission antenna for transmitting a wireless signal. A storing portion that stores the mechanical key is provided in a case in which the transmission antenna is provided. When the mechanical key is stored in the storing portion, the transmission antenna is electrically connected to the mechanical key. In the portable communication device, the storage state of the mechanical key in the storing portion is detected by a push switch, and impedance correction in a (Continued)

communication circuit is performed by an impedance matching circuit in accordance with the detection result.

6 Claims, 8 Drawing Sheets

(51) Int. Cl.
  *E05B 19/00*   (2006.01)
  *B60R 25/01*   (2013.01)
  *B60R 25/24*   (2013.01)
  *E05B 49/00*   (2006.01)
(52) U.S. Cl.
  CPC ........ *B60R 25/243* (2013.01); *E05B 19/0082* (2013.01); *E05B 49/002* (2013.01)
(58) Field of Classification Search
  USPC ................................. 340/5.6–5.65
  See application file for complete search history.

PORTABLE COMMUNICATION DEVICE

CROSS-REFERENCE TO RELATED APPLICATIONS

This application is the U.S. national stage of PCT/JP2016/058646 filed Mar. 18, 2016, which claims priority of Japanese Patent Application No. JP 2015-056477 filed Mar. 19, 2015.

TECHNICAL FIELD

The present invention relates to a portable communication device that locks or unlocks a vehicle door by performing wireless communication with a communication device provided in the vehicle.

BACKGROUND

Conventionally, a system is widely prevalent in which a vehicle door is remotely locked or unlocked by wireless communication performed between a vehicle-mounted communication device that is provided in the vehicle and a portable communication device in a user's possession. This system can be called a keyless entry system or a smart entry system. Such a system is sometimes provided with a mechanical key for locking or unlocking the vehicle door in the case where a malfunction, battery exhaustion, or the like occurs in the portable communication device in the user's possession.

JP 2009-177644A discloses a mobile device that has a transmission/reception circuit for transmitting and receiving wireless signals via an antenna, and also has an emergency mechanical key that is retrievably stored in a storing portion. The mobile device disclosed in JP 2009-177644A includes a push switch that detects whether or not the mechanical key is stored in the storing portion, and a control device that performs wireless signal directivity correction by controlling an antenna switching switch according to whether or not the mechanical key is stored. Also, JP 2009-177642A discloses a similarly-configured mobile device that includes an impedance matching circuit that adjusts the impedance between an antenna and a transmission/reception circuit, and a control device that controls the impedance matching circuit according to whether or not the mechanical key is stored.

Portable communication devices for locking and unlocking a vehicle door are carried by users, and therefore there is desire for size reduction. The smaller the portable communication device is, the greater the need is to also reduce the size of the antenna for performing wireless signal transmission and reception, and there is a problem of degradation in communication efficiency. The mobile devices disclosed in JP 2009-177644A and JP 2009-177642A are for preventing a reduction in communication efficiency caused by the presence of the mechanical key, and therefore fundamentally cannot solve this problem.

The present invention was achieved in light of the foregoing situation, and an object of the present invention is to provide a portable communication device that can suppress degradation in communication efficiency caused by a reduction in device size.

SUMMARY

A portable communication device according to the present invention is a portable communication device that performs wireless communication with a vehicle and locks or unlocks a door of the vehicle, the portable communication device including: an antenna that transmits or receives a wireless signal; a key that is made of an electrical conductor and mechanically locks or unlocks the door of the vehicle; and a connection unit that electrically connects the antenna and the key.

Also, the portable communication device according to the present invention includes: a case in which the antenna is provided; and a storing portion that is provided in the case and stores the key, wherein the connection unit electrically connects the antenna and the key in a case where the key is stored in the housing portion.

Also, the portable communication device according to the present invention includes: a communication circuit that performs transmission or reception of a wireless signal via the antenna; a detection unit that detects a storage state of the key in the storing portion; and a correction unit that corrects an impedance of the communication circuit in accordance with a detection result obtained by the detection unit.

Also, the portable communication device according to the present invention includes: a detection unit that detects a storage state of the key in the storing portion; and a correction unit that corrects a directivity of the antenna in accordance with a detection result obtained by the detection unit.

Also, in the portable communication device according to the present invention, the antenna is a loop antenna for wireless signal transmission.

In the present invention, the portable communication device includes a key for mechanically locking or unlocking the vehicle door, and this key is made of an electrical conductor such as a metal. The portable communication device also includes the antenna for transmitting or receiving a wireless signal, one example of which is a loop antenna for wireless signal transmission. The portable communication device has a configuration in which this antenna can be electrically connected to the key made of an electrical conductor. Accordingly, the key made of an electrical conductor can be utilized as an additional antenna, thus making it possible to virtually increase the size of the antenna, and making it possible to improve communication efficiency.

Also, in this configuration of the present invention, the storing portion is provided in the case in which the antenna is provided, and the key made of an electrical conductor can be stored in the storing portion. In the case of mechanically locking or unlocking the door, the user can remove the key made of an electrical conductor that is stored in the storing portion, insert it into a keyhole provided in the vehicle door, and perform a lock or unlock operation. A configuration is possible in which the key is removable from the case in the unstored state, a configuration is possible in which the key cannot be removed from the case, but can be caused to protrude from the storing portion by the user performing a rotation or slide operation or the like, or another configuration is possible. The portable communication device is configured to electrically connect the antenna to the key in the state where the key is stored in the storing portion.

Also, in the present invention, the antenna and the key made of an electrical conductor are not electrically connected in the state where the key is not stored in the storing portion. For this reason, depending on whether or not the key is stored in the storing portion, the virtual size of the antenna changes, and communication properties related to wireless communication change. In view of this, by detecting the storage state of the key in the storing portion and performing impedance correction in the communication circuit, antenna directivity correction, or the like in accordance with the detection result, it is possible to perform wireless communication that is suited to the virtual size of the antenna.

Advantageous Effects of Invention

According to the present invention, the size of the antenna for wireless communication can be virtually increased by electrically connecting the antenna for wireless communication to the key that is made of an electrical conductor, thus making it possible to suppress degradation in communication efficiency even in a reduced-size portable communication device.

DETAILED DESCRIPTION OF PREFERRED EMBODIMENTS

Figure 1:
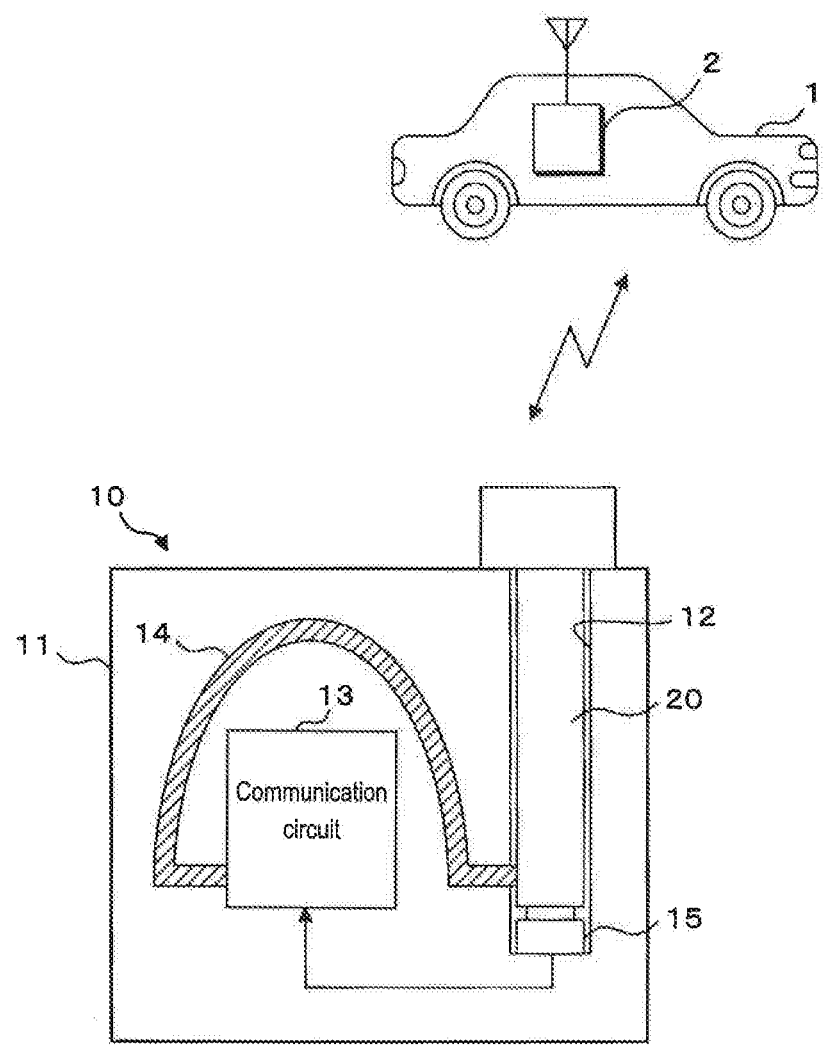
FIG. 1 is a schematic diagram for describing a configuration of a portable communication device according to an embodiment.
Figure 2:
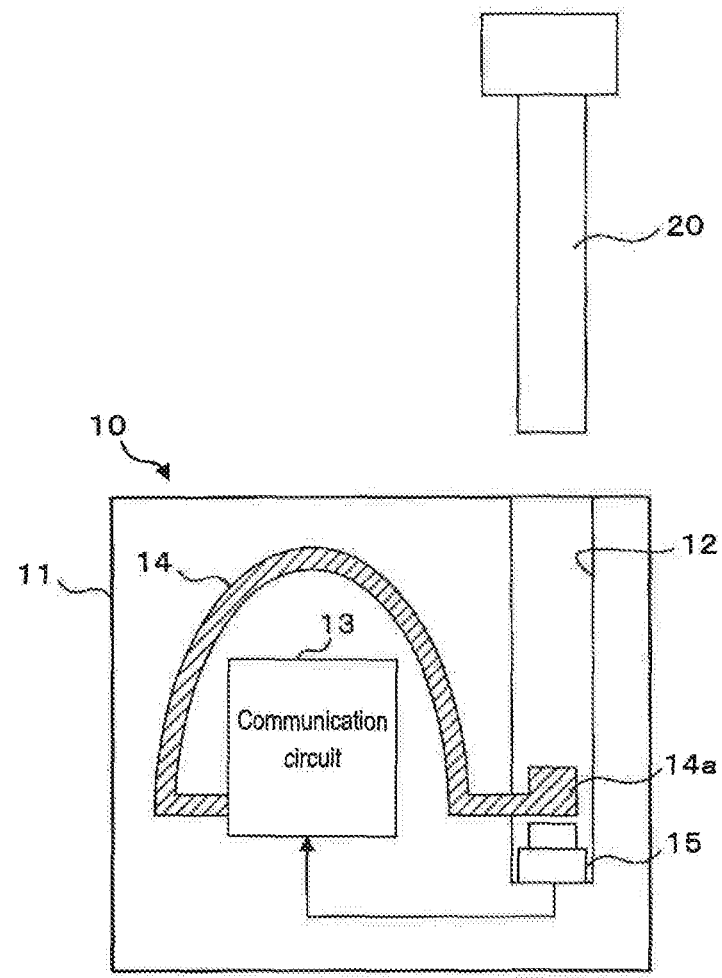
FIG. 2 is a schematic diagram for describing the configuration of the portable communication device according to the embodiment.

Hereinafter, the present invention will be described in detailed with reference to drawings showing embodiments of the present invention. FIGS. 1 and 2 are schematic diagrams for describing the configuration of a portable communication device according to the present embodiment. A portable communication device 10 according to the present embodiment performs wireless communication with a vehicle-mounted communication device 2 that is provided in a vehicle 1. The portable communication device 10 can lock or unlock a door of the vehicle 1 by performing wireless communication with the vehicle-mounted communication device 2. In other words, the portable communication device 10 according to the present embodiment is used in a so-called keyless entry system, smart entry system, or the like, and can be called a wireless key, a remote key, or the like.

The portable communication device 10 according to the present embodiment includes a mechanical key 20 for allowing a user to lock or unlock the door of the vehicle 1 in the case where wireless communication cannot be performed due to a malfunction, battery exhaustion, or the like. The mechanical key 20 is a key that is made of an electrical conductor such as a metal, and can lock or unlock the door of the vehicle 1 by being inserted into a keyhole provided in the door and then being turned.

The portable communication device 10 includes a case 11 that has an approximately cuboid shape for example, and a communication circuit 13, an antenna 14, and the like are stored in the case 11. A storing portion 12 that removably stores the mechanical key 20 is also provided in the case 11. The storing portion 12 can be a recessed portion into which the mechanical key 20 can be inserted through an opening provided in a side surface of the case 11, for example. Note that FIG. 1 shows the state where the mechanical key 20 is stored in the storing portion 12, and FIG. 2 shows the state where the mechanical key 20 has been removed.

A push switch 15 is arranged in the deepest portion of the storing portion 12, and the tip portion of the mechanical key 20 pushes (presses) the push switch 15 when the mechanical key 20 is stored in the storing portion 12. A signal indicating the state (whether pushed or not) of the push switch 15 is input to the communication circuit 13. The communication circuit 13 is a circuit that performs processing such as modulation and demodulation for wireless communication, and is configured by arranging circuit elements on a circuit board, for example.

A transmission antenna 14 for transmitting wireless signals is connected to the communication circuit 13. The transmission antenna 14 is a loop antenna in which a conductive body made of a metal or the like is formed in the shape of a circular arc, a circular ring, or the like. One end of the transmission antenna 14 is connected to the communication circuit 13. The other end of the transmission antenna 14 is arranged at the inner circumferential surface of the storing portion 12 or the like, and is a connection portion 14a for electrical connection to the mechanical key 20. When the mechanical key 20 is stored in the storing portion 12, it comes into contact with the connection portion 14a of the transmission antenna 14, and the transmission antenna 14 and the mechanical key 20 become electrically connected. In this state, the mechanical key 20 plays the role of a transmission antenna.

Figure 3:
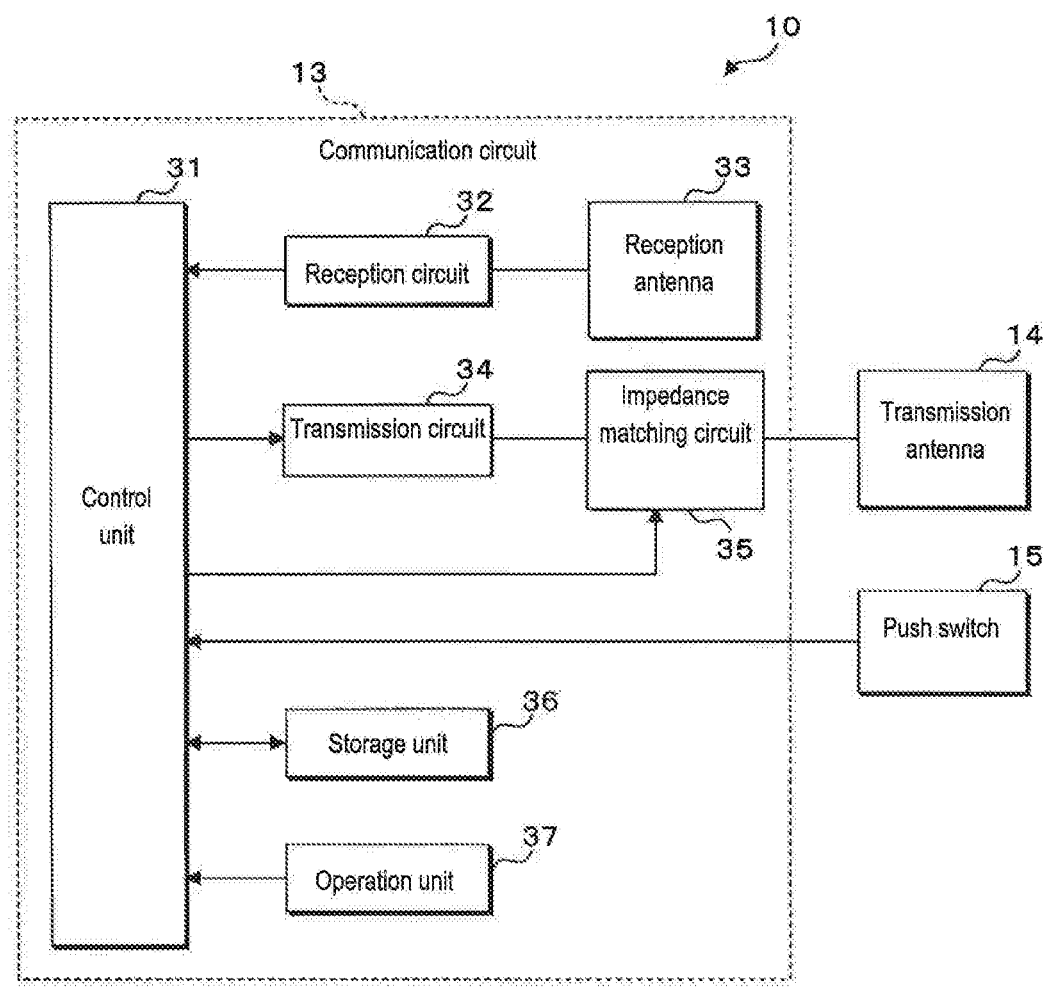
FIG. 3 is a block diagram showing a configuration of a communication circuit of the portable communication device.

FIG. 3 is a block diagram showing the configuration of the communication circuit 13 of the portable communication device 10. The communication circuit 13 of the portable communication device 10 is configured to include a control unit 31, a reception circuit 32, a reception antenna 33, a transmission circuit 34, an impedance matching circuit 35, a storage unit 36, an operation unit 37, and the like. The control unit 31 controls operations of the units in the portable communication device 10, and performs processing for accepting operations performed on the operation unit 37, processing for wireless communication with the vehicle-mounted communication device 2, processing for correcting the impedance of the transmission antenna 14, and the like.

The storage unit 36 is configured using a nonvolatile memory element such as an EEPROM (Electrically Erasable Programmable Read Only Memory). The storage unit 36 stores information such as authentication information or identification information that is given to the portable communication device 10 in advance. The control unit 31 reads out information stored in the storage unit 36 and transmits it to the vehicle-mounted communication device 2 using a wireless signal. By determining whether or not the information included in the received wireless signal is correct, the vehicle-mounted communication device 2 can determine whether or not the portable communication device 10 that transmitted the wireless signal is legitimate.

The operation unit 37 is constituted using a push-type button or the like, and is subjected to a push operation or the like performed by the user. For example, the operation unit 37 may be constituted to include two buttons, namely a push button for locking the door of the vehicle 1 and a push button for unlocking the door. As another example, the operation unit 37 may alternatingly lock and unlock the door of the vehicle 1 when a single push button is repeatedly operated. Note that the operation unit 37 may be constituted by a member other than a push button, such as a slide switch or a touch panel.

The reception circuit 32 receives, via the reception antenna 33, a wireless signal transmitted by the vehicle-mounted communication device 2, demodulates and converts the received signal into digital information, and passes the converted information to the control unit 31. In the present embodiment, a coil antenna is used as the reception antenna 33.

The transmission circuit 34 transmits a wireless signal from the transmission antenna 14 to the vehicle-mounted communication device 2 in accordance with a transmission instruction from the control unit 31. The transmission circuit 34 transmits a wireless signal by outputting, to the transmission antenna 14 via the impedance matching circuit 35, a signal obtained by modulating information received from the control unit 31 along with the transmission instruction. The information given to the transmission circuit 34 by the control unit 31 is a lock/unlock instruction for the door of the vehicle 1, identification information stored in the storage unit 36, and the like.

The impedance matching circuit 35 is a circuit that, under control of the control unit 31, corrects the impedance between the transmission circuit 34 and the transmission antenna 14 and optimizes the transmission and reception of wireless signals between the portable communication device 10 and the vehicle-mounted communication device 2. The impedance matching circuit 35 can be configured as an LC circuit that employs a coil and a capacitor, for example. The control unit 31 outputs a control signal to the impedance matching circuit 35 in accordance with the state of the push switch 15, that is to say whether or not the mechanical key 20 is stored in the storing portion 12.

Figure 4:
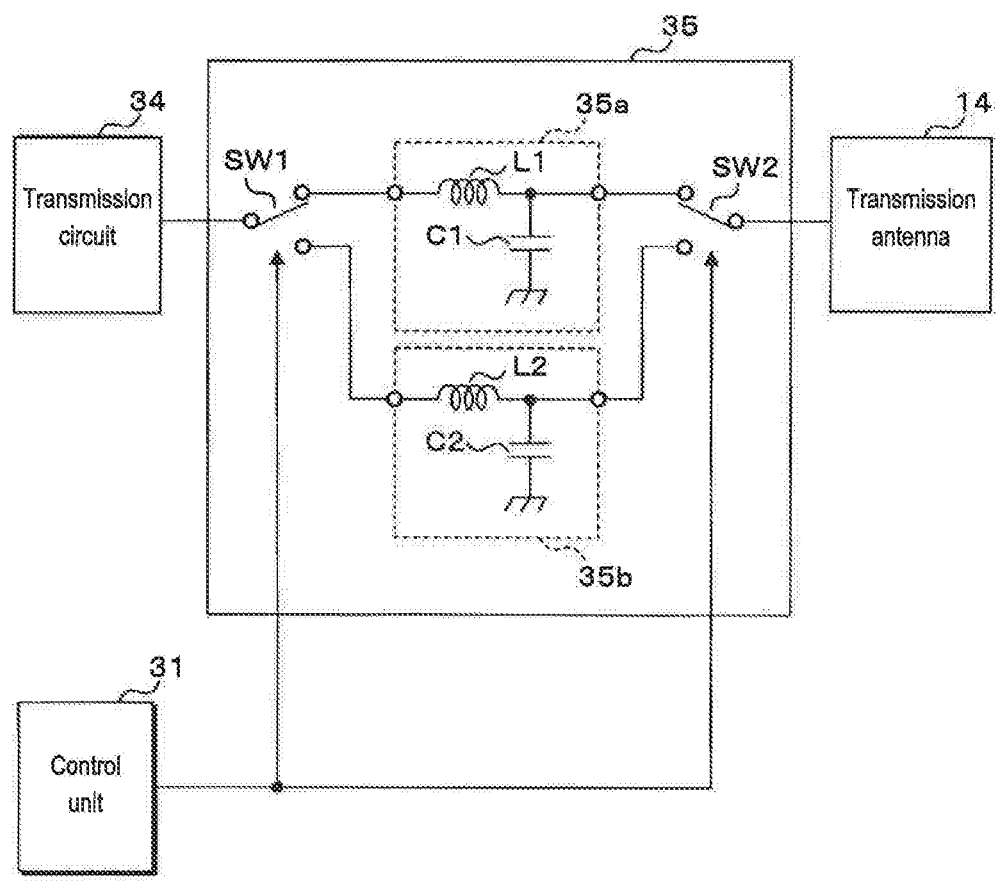
FIG. 4 is a circuit diagram showing an example of the configuration of an impedance matching circuit.

FIG. 4 is a circuit diagram showing an example of the configuration of the impedance matching circuit 35. The impedance matching circuit 35 according to the present embodiment includes a first circuit 35*a* that is configured using a coil L1 and a capacitor C1, a second circuit 35*b* that is configured using a coil L2 and a capacitor C2, and switches SW1 and SW2 for switching which of the first circuit 35*a* and the second circuit 35*b* is to intervene between the transmission circuit 34 and the transmission antenna 14.

The first circuit 35*a* has a configuration in which the coil L1 is arranged in the signal transmission path between the transmission circuit 34 and the transmission antenna 14, one end of the capacitor C1 is connected to the end portion on the transmission antenna 14 side of the coil L1, and the other end of the capacitor C1 is connected to ground potential. The second circuit 35*b* has a circuit configuration similar to that of the first circuit 35*a*, but the inductance of the coil L2 and the capacitance of the capacitor C2 are different from those of the coil L1 and the capacitor C2 of the first circuit 35*a*. For example, the inductance of the coil L1 and the capacitance of the capacitor C1 of the first circuit 35*a* are set to values that enable optimization of wireless communication in the state where the transmission antenna 14 and the mechanical key 20 are electrically connected. The inductance of the coil L2 and the capacitance of the capacitor C2 of the second circuit 35*b* are set to values that enable optimization of wireless communication in the case where the mechanical key 20 is not connected to the transmission antenna 14.

In accordance with the state of the push switch 15, the control unit 31 switches the switches SW1 and SW2 to the first circuit 35*a* side in the case where the mechanical key 20 is stored in the storing portion 12. Accordingly, in the impedance matching circuit 35, the first circuit 35*a* is selected, and the first circuit 35*a* intervenes between the transmission circuit 34 and the transmission antenna 14. Also, if the mechanical key 20 is not stored in the storing portion 12, the control unit 31 switches the switches SW1 and SW2 to the second circuit 35*b* side. Accordingly, in the impedance matching circuit 35, the second circuit 35*b* is selected, and the second circuit 35*b* intervenes between the transmission circuit 34 and the transmission antenna 24.

Figure 5:
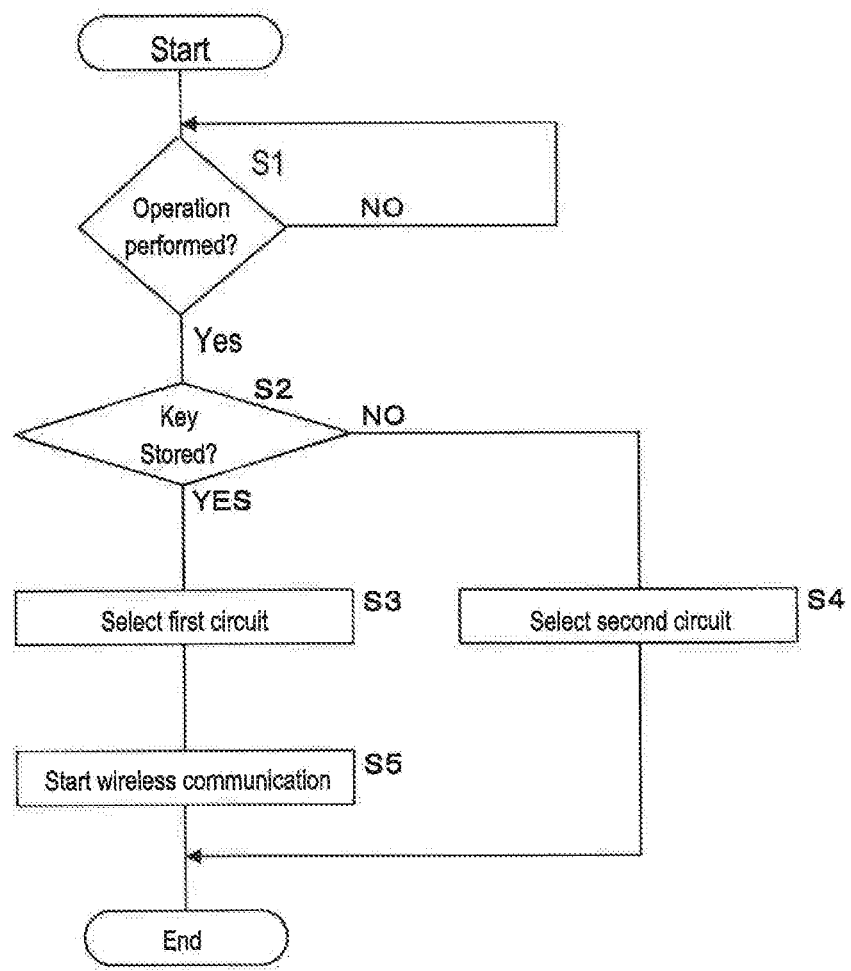
FIG. 5 is a flowchart showing a procedure of processing performed by the portable communication device.

FIG. 5 is a flowchart showing a procedure of processing performed by the portable communication device 10. The control unit 31 of the portable communication device 10 determines whether or not an operation has been performed on the operation unit 37 (step S1). If an operation has not been performed (S1: NO), the control unit 31 waits until an operation is performed. If an operation has been performed (S1: YES), the control unit 31 determines, based on a signal input from the push switch 15, whether or not the mechanical key 20 is stored in the storing portion 12 (step S2). If the mechanical key 20 is stored (S2: YES), the control unit 31 selects the first circuit 35*a* by controlling switching of the switches SW1 and SW2 of the impedance matching circuit 35 (step S3). However, if the mechanical key 20 is not stored (S2: NO), the control unit 31 selects the second circuit 35*b* (step S4). After performing this selection in step S3 or S4, the control unit 31 starts wireless communication with the vehicle-mounted communication device 2 by giving transmission information to the transmission circuit 34 (step S5).

The portable communication device 10 according to the present embodiment having the above configuration includes the mechanical key 20 for mechanically locking or unlocking the door of the vehicle 1. The mechanical key 20 is made of an electrical conductor such as a metal. The portable communication device 10 also includes the transmission antenna 14 for transmitting a wireless signal. For example, a loop antenna can be used as the transmission antenna 14. The portable communication device 10 has a configuration in which the transmission antenna 14 can be electrically connected to the mechanical key 20. Accordingly, the mechanical key 20 can be utilized as an additional antenna, thus making it possible to virtually increase the size of the transmission antenna 14, and making it possible to improve communication efficiency.

Also, the portable communication device 10 has a configuration in which the storing portion 12 is provided in the case 11 in which the transmission antenna 14 is provided, and the mechanical key 20 can be stored in the storing portion. In the case of mechanically locking or unlocking the door of the vehicle 1, the user can remove the mechanical key 20 that is stored in the storing portion 12, insert it into a keyhole provided in the door of the vehicle 1, and perform a lock or unlock operation. In the case where the mechanical key 20 is stored in the storing portion 12 of the portable communication device 10, the transmission antenna 14 is electrically connected to the mechanical key 20.

Also, in the portable communication device 10, the storage state of the mechanical key 20 in the storing portion 12 is detected by the push switch 15, and impedance correction in the communication circuit 13 is performed by the impedance matching circuit 35 in accordance with the detection result. Accordingly, in the case where communication properties change due to a change in the virtual size of the transmission antenna 14 caused by the presence or absence of the mechanical key 20, it is possible to make a correction for the influence of this change and perform appropriate wireless communication.

Note that in the present embodiment, the portable communication device 10 is configured to exchange wireless signals with the vehicle-mounted communication device 2, but the present invention is not limited to this, and a configuration is possible in which the portable communication device 10 only either transmits or receives wireless signals. Also, although the mechanical key 20 is electrically connected to the transmission antenna 14 in the above configuration, the present invention is not limited to this, and a configuration is possible in which the mechanical key 20 is electrically connected to the reception antenna 33. Furthermore, a single antenna may be used as the transmission and reception antennas. Moreover, although the portable communication device 10 is configured to transmit a wireless signal in accordance with an operation performed on the operation unit 37, the present invention is not limited to this. For example, the portable communication device 10 may be configured to transmit a wireless signal in response to the reception of a wireless signal from the vehicle-mounted communication device 2.

Also, whether or not the mechanical key 20 is stored in the storing portion 12 is detected by the push switch 15 in the above configuration, the present invention is not limited to this, and a configuration is possible in which the detection is made using another method. Furthermore, the configuration of the impedance matching circuit 35 show in FIG. 4 is one example, and the present invention is not limited to this.

First Variation

Figure 6:
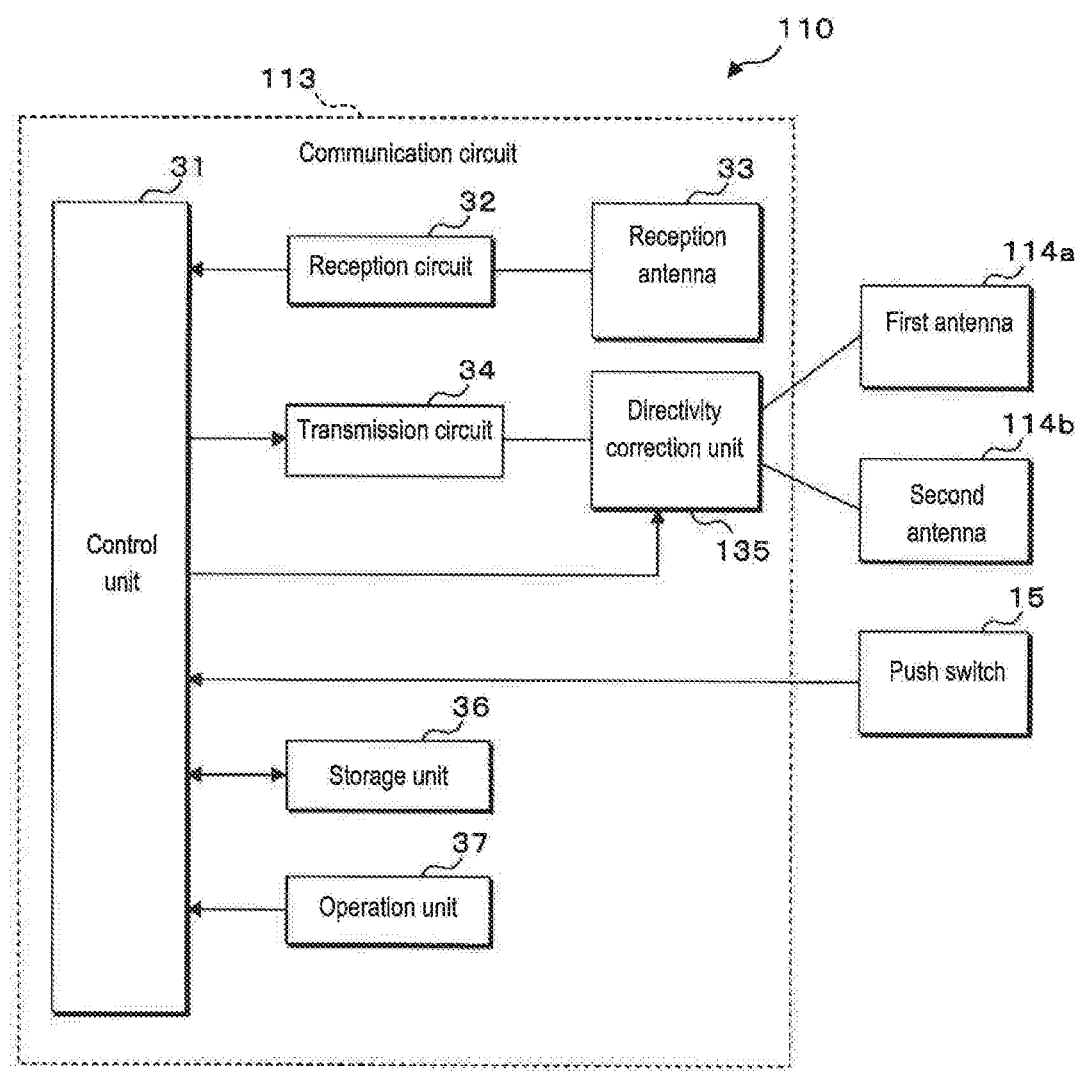
FIG. 6 is a block diagram showing a configuration of a communication circuit 113 of a portable communication device according to a first variation.

The above embodiment describes a configuration in which the portable communication device 10 uses the impedance matching circuit 35 to perform impedance correction in accordance with whether or not the mechanical key 20 is stored, but the present invention is not limited to this. FIG. 6 is a block diagram showing the configuration of a communication circuit 113 of a portable communication device 110 according to a first variation. The portable communication device 110 according to the first variation is configured to correct the directivity of the transmission antenna 14 in accordance with whether or not the mechanical key 20 is stored.

The portable communication device 110 according to the first variation includes a directivity correction unit 135 in place of the impedance matching circuit 35 of the portable communication device 10 shown in FIG. 3, and also includes a first antenna 114a and a second antenna 114b as transmission antennas. Under control of the control unit 31, the directivity correction unit 135 corrects the transmission antenna directivity by connecting either the first antenna 114a or the second antenna 114b to the transmission circuit 34. The first antenna 114a is an antenna that is electrically connected to the mechanical key 20 stored in the storing portion 12, and is designed so as to obtain optimum directivity in this state. The second antenna 114b is an antenna that is not electrically connected to the mechanical key 20, and is designed so as to obtain optimum directivity in the state where the mechanical key 20 is not stored in the storing portion 12.

The control unit 31 uses the push switch 15 to determine whether or not the mechanical key 20 is stored in the storing portion 12. In the case where the mechanical key 20 is stored, the control unit 31 performs control to cause the directivity correction unit 135 to select the first antenna 114a. In the case where the mechanical key 20 is not stored, the control unit 31 performs control to cause the directivity correction unit 135 to select the second antenna 114b.

In the portable communication device 110 according to the first variation having the above configuration, the storage state of the mechanical key 20 in the storing portion 12 is detected by the push switch 15, and the transmission antenna directivity is corrected by the directivity correction unit 135 in accordance with the detection result. Accordingly, in the case where the directivity changes due to a change in the virtual size of the transmission antenna 14 caused by the presence or absence of the mechanical key 20, it is possible to make a correction for the influence of this change and perform appropriate wireless communication.

Note that the portable communication device may be configured to include both the impedance matching circuit 35 shown in FIG. 3 and the directivity correction unit 135 shown in FIG. 6. In this case, a configuration is possible in which in the circuit shown in FIG. 4 for example, the first antenna 114a is connected to the first circuit 35a, the second antenna 114b is connected to the second circuit 35b, and the control unit 31 switches the switch SW1.

Second Variation

Figure 7:
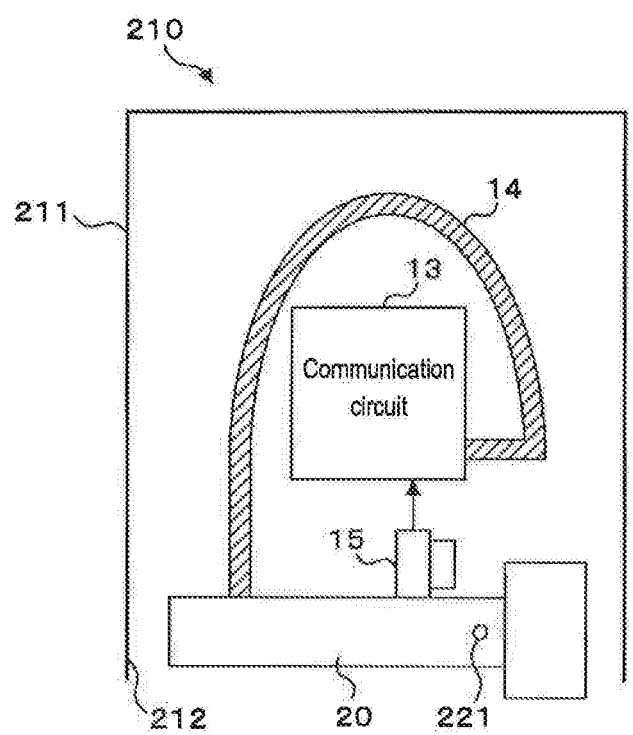
FIG. 7 is a schematic diagram for describing a configuration of a portable communication device according to a second variation.
Figure 8:
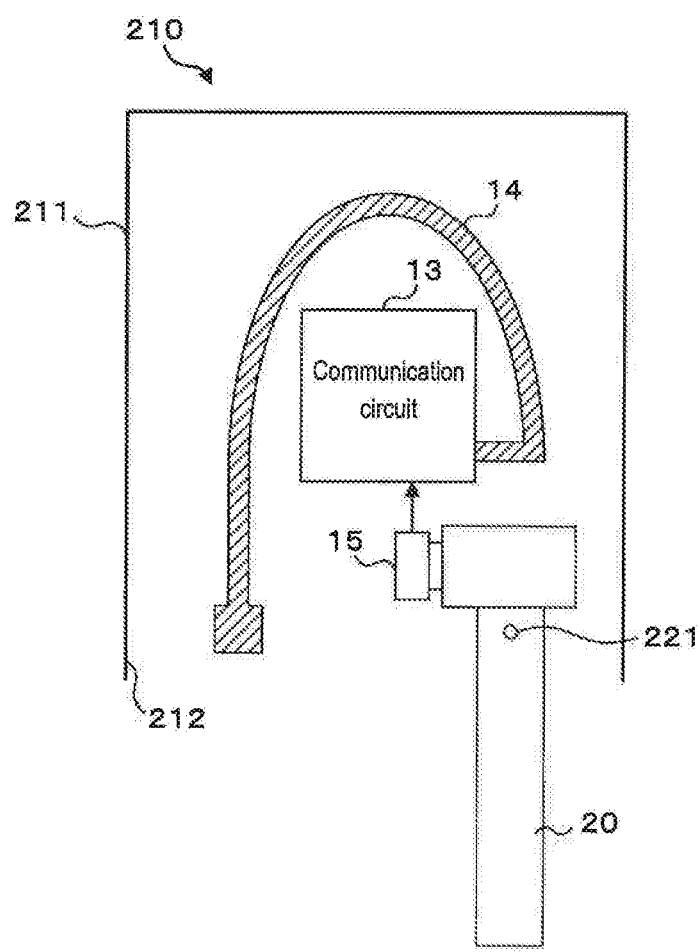
FIG. 8 is a schematic diagram for describing the configuration of the portable communication device according to the second variation.

In the configuration of the above embodiment, the mechanical key 20 can be removed from the case 11 of the portable communication device 10, but the present invention is not limited to this. FIGS. 7 and 8 are schematic diagrams for describing the configuration of a portable communication device 210 according to a second variation. The portable communication device 210 according to the second variation has a configuration in which an opening is provided in one side surface of a case 211 that has an approximately cuboid shape, and the mechanical key 20 is inserted into and removed from the case 211 through that opening. In other words, a region that is inside the case 211 and in the vicinity of the side surface is a storing portion 212 for the mechanical key 20. The mechanical key 20 is rotatably fixed to the case 211 by a rotation shaft 221. The user can use the mechanical key 20 to mechanically lock or unlock the door of the vehicle 1 by rotating the mechanical key 20 approximately 90 degrees about the rotation shaft 221 such that the mechanical key 20 stored in the case 211 becomes exposed to the outside. Note that FIG. 7 shows the state where the mechanical key 20 is stored in the storing portion 212, and FIG. 8 shows the state where the mechanical key 20 has been exposed.

The communication circuit 13, the transmission antenna 14, the push switch 15, and the like are stored in the case 211 of the portable communication device 210. One end of the transmission antenna 14 is connected to the communication circuit 13. The other end of the transmission antenna 14 is arranged at an inner surface of the storing portion 211 of the case 211 or the like, and is a connection portion 14a for electrical connection to the mechanical key 20. When the mechanical key 20 is stored in the storing portion 212, it comes into contact with the connection portion 14a of the transmission antenna 14, and the transmission antenna 14 and the mechanical key 20 become electrically connected. In this state, the mechanical key 20 plays the role of a transmission antenna.

The push switch 15 is arranged at a position where it is not pushed in the state where the mechanical key 20 is stored in the storing portion 212, but is pushed by a side surface of an end portion or the like of the mechanical key 20 when the mechanical key 20 is rotated approximately 90 degrees from the stored state so as to be exposed to the outside of the case 211. A signal indicating the state of the push switch 15 is input to the communication circuit 13.

The processing performed by the communication circuit 13 is substantially the same as the processing performed by the communication circuit 13 of the portable communication device 10 according to the embodiment described above. For example, the communication circuit 13 performs processing for controlling the impedance matching circuit 35 in accordance with the state of the push switch 15, that is to say whether or not the mechanical key 20 is stored. The communication circuit 13 also performs processing for transmitting a wireless signal to the vehicle-mounted communication device 2, processing for receiving a wireless signal from the vehicle-mounted communication device 2, and the like.

As described above in the second variation, the storage of the mechanical key 20 in the portable communication device can be achieved by various structures, and a structure other than those shown in FIGS. 1 and 2 and FIGS. 7 and 8 may be employed. Note that in the case of a structure in which the mechanical key 20 is not removed from the case 211 as with the portable communication device 210 according to the second variation, a configuration is possible in which the transmission antenna 14 and the mechanical key 20 are always connected. With this configuration, it is not absolutely necessary to perform impedance and directivity correction, but correction may be performed if the impedance and directivity change due to a change in the position of the mechanical key 20.

The invention claimed is:

1. A portable communication device that performs wireless communication with a vehicle and locks or unlocks a door of the vehicle, the portable communication device comprising:
an antenna that transmits or receives a wireless signal;
a key that is made of an electrical conductor and mechanically locks or unlocks the door of the vehicle;
a case in which the antenna is provided; and
a storing portion that is provided in the case and stores the key,
wherein a portion of the antenna is arranged in the storing portion, and
in a case where the key is stored in the storing portion, the key is in contact with the portion of the antenna in the storing portion, and the antenna and the key are electrically connected.

2. The portable communication device according to claim 1, comprising:
a communication circuit that performs transmission or reception of a wireless signal via the antenna;
a detection unit that detects a storage state of the key in the storing portion; and
a correction unit that corrects an impedance of the communication circuit in accordance with a detection result obtained by the detection unit.

3. The portable communication device according to claim 1, comprising:
a detection unit that detects a storage state of the key in the storing portion; and
a correction unit that corrects a directivity of the antenna in accordance with a detection result obtained by the detection unit.

4. The portable communication device according to claim 1, wherein the antenna is a loop antenna for wireless signal transmission.

5. The portable communication device according to claim 2, wherein the antenna is a loop antenna for wireless signal transmission.

6. The portable communication device according to claim 3, wherein the antenna is a loop antenna for wireless signal transmission.

* * * * *